United States Patent
Fitzgerald et al.

(10) Patent No.: US 8,301,379 B2
(45) Date of Patent: Oct. 30, 2012

(54) METHOD OF INTERPOLATION BETWEEN A PLURALITY OF OBSERVED TENSORS

(75) Inventors: James Desmond Fitzgerald, Brighton (AU); Horst Holstein, Ceredigion (GB)

(73) Assignee: Desmond Fitzgerald & Associates Pty Ltd, Brighton (Victoria) (AU)

( * ) Notice: Subject to any disclaimer, the term of this patent is extended or adjusted under 35 U.S.C. 154(b) by 695 days.

(21) Appl. No.: 12/162,070

(22) PCT Filed: Jan. 24, 2007

(86) PCT No.: PCT/AU2007/000066
§ 371 (c)(1),
(2), (4) Date: Dec. 4, 2008

(87) PCT Pub. No.: WO2007/085048
PCT Pub. Date: Aug. 2, 2007

(65) Prior Publication Data
US 2009/0177402 A1    Jul. 9, 2009

(30) Foreign Application Priority Data
Jan. 24, 2006  (AU) ................................ 2006900346

(51) Int. Cl.
G01V 3/38   (2006.01)
G01V 1/28   (2006.01)
G01V 3/00   (2006.01)

(52) U.S. Cl. ................ 702/5; 702/14; 324/323

(58) Field of Classification Search .............. 702/5, 14; 324/323
See application file for complete search history.

(56) References Cited

U.S. PATENT DOCUMENTS

| | | |
|---|---|---|
| 6,270,459 B1 | 8/2001 | Konofagou et al. |
| 6,278,948 B1 | 8/2001 | Jorgensen et al. |
| 6,306,091 B1 | 10/2001 | Sumanaweera et al. |
| 6,445,182 B1 * | 9/2002 | Dean et al. ............... 324/309 |
| 6,502,037 B1 | 12/2002 | Jorgensen et al. |
| 2003/0214289 A1 | 11/2003 | van Muiswinkel et al. |
| 2004/0172199 A1 | 9/2004 | Chavarria et al. |
| 2005/0114032 A1 | 5/2005 | Wang |

FOREIGN PATENT DOCUMENTS

FR   2 857 757   1/2005

OTHER PUBLICATIONS

Desmond et al., "Innovative Data Processing Methods for Gradient Airborne Geophysical Data Sets", The Leading Edge, Jan. 2006, 5 pages.
PCT International Search Report, PCT Serical No. PCT/AU2007/000066, dated May 7, 2007, 4 pages.
PCT Written Opinion of the International Searchinhg Authority, PCT Serial No. PCT/AU2007/000066, dated May 7, 2007.

* cited by examiner

*Primary Examiner* — Janet Suglo
(74) *Attorney, Agent, or Firm* — Andrew Wilford

(57) ABSTRACT

A method of interpolation between a plurality of field gradient tensors including the steps of:
  accessing a plurality of field gradient data;
  formatting said plurality of field gradient data into 3-dimensional tensors of rank 2;
  determining a rotational matrix and a structural matrix for each tensor;
  interpolating said structural matrices;
  detecting errors in the raw data only apparent using the rotational component.
  interpolating said rotational matrices as quaternions on the surface of a unit 4-sphere;
  reconstructing said structural matrices and said rotational matrices to yield field gradient tensors at the interpolation points, wherein the interpolation is between two said field gradient tensors, the field gradient tensors being expressed as 3×3 matrices of values, each resolved into a rotational matrix and a structural matrix with three diagonal components.

10 Claims, 1 Drawing Sheet

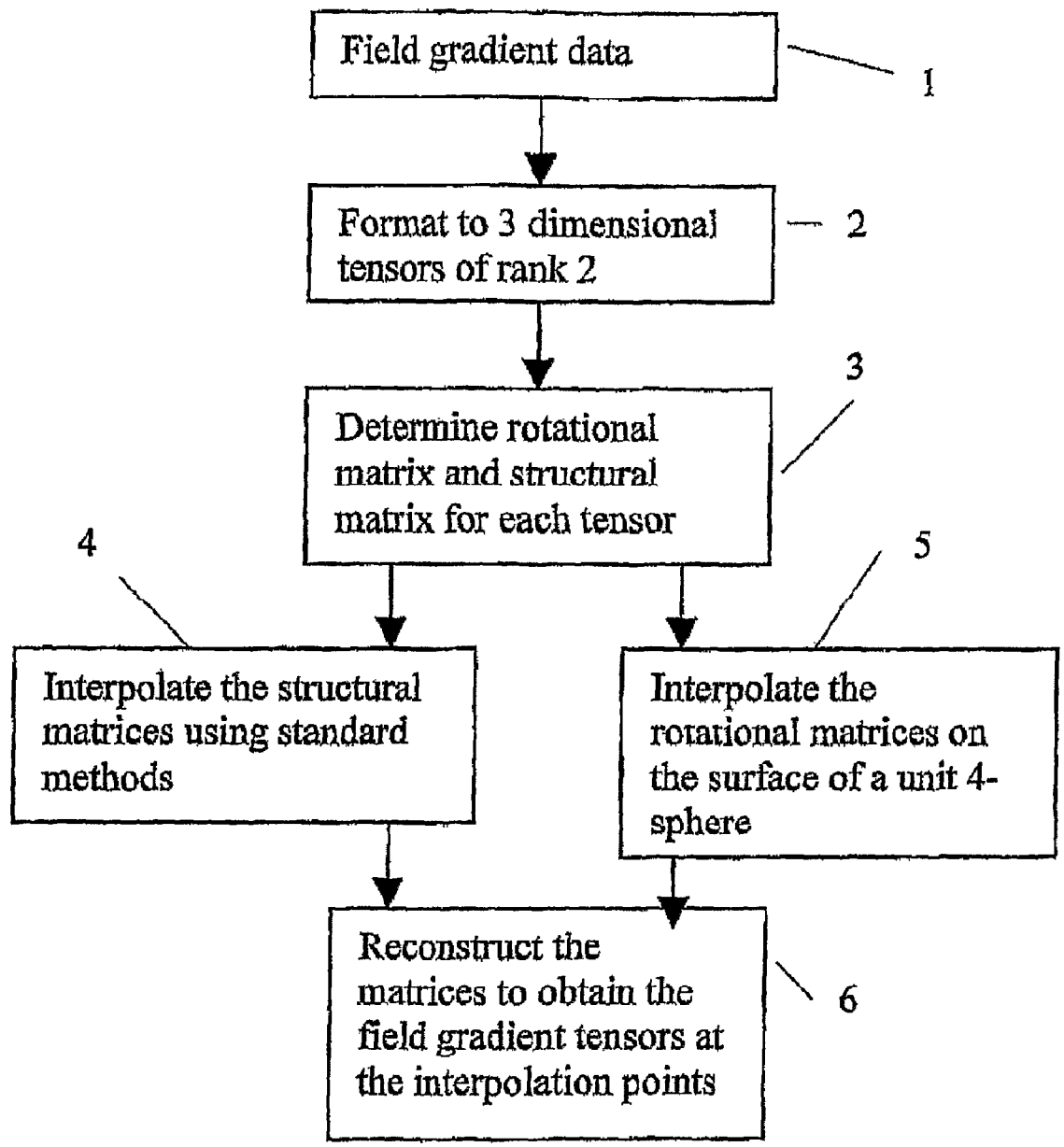

METHOD OF INTERPOLATION BETWEEN A PLURALITY OF OBSERVED TENSORS

CROSS REFERENCE TO RELATED APPLICATIONS

This application is a National Stage of International Application PCT/AU2007/000066 filed Jan. 24, 2007. Applicant claims foreign priority benefits under 35 U.S.C. 119(a)-(d) of the following foreign application for patent: Australian Application No. 2006900346, filed Jan. 24, 2006, which is hereby, incorporated by reference in its entirety.

FIELD OF THE INVENTION

This invention relates to interpolation between gravity, electro-magnetic and possibly other field gradient data sets. In particular this invention relates to an improved method of interpolation between field gradient data sets, including an improved method of interpolation between a plurality of observed field gradient tensors.

BACKGROUND OF THE INVENTION

Geophysical field gradient surveys generally are conducted by using line scans which give results along that line. Where an area is to be surveyed a number of line scans, preferably parallel, are made and interpolations of data between those line scans are made. The data gathering process using airborne sensors is very expensive. While this has been carried out during the last twenty years for marine gravity gradients, it is only in the last three years that commercial services in this field have been offered for airborne. Similarly, commercial services for airborne magnetic gradients are now being offered.

However, present methods do not make the best use of the information and there is a need for improved estimation and visualisation of geological features. To obtain a visual representation of the feature, for example on a computer screen, the intensity of the observed field is usually rendered as a map of coloured pixels at specified X-Y positions on the screen. The colour of the pixel relates to the intensity of the subject field. The X-Y positions on the computer screen relate to specific geographical grid points on the earth's surface. The subject tensors are derived from instrument readings taken at geographical positions which usually do not coincide with the required grid points. Since it is necessary to calculate the intensity of the grid points relating to the display, it is necessary to interpolate between the observed values to obtain the values at the required grid points. If the interpolation can be improved, previously unseen geological features may now be seen on the resultant coloured map. At present interpolation is effected using weighted linear methods or other well known means, using only the raw data. The rotational component of the raw data is not isolated. Ultimate users of the data would be unaware that much valuable information was lost thereby. As gatherers of data are unaware that much of the noise of the signal reports in the rotational component, they may neglect to gather the full gradient data in the first place.

While the separation of structural and rotational tensors can be obtained by hand using graphical methods such as "Mohr's Circles" which are well known in the rock mechanics field, those methods are far too slow to be useful for the volumes of data involved in geophysical surveys, especially airborne geophysical surveys.

It is an object of the present invention to ameliorate disadvantages referred to above.

SUMMARY OF THE INVENTION

According to one aspect of the present invention there is provided a method of interpolation between a plurality of field gradient tensors including the steps of:
 accessing a plurality of field gradient data;
 formatting said plurality of field gradient data into three-dimensional tensors of rank 2;
 determining a rotational matrix and a structural matrix for each said tensor;
 interpolating said structural matrices;
 interpolating said rotational matrices on the surface of a unit 4-sphere;
 reconstructing said structural matrices and said rotational matrices to yield field gradient tensors at the interpolation points.

Preferably, the interpolation is between two observed field gradient tensors.

The field gradient tensor is expressed as a 3×3 matrix of values. This matrix is resolved into a rotational matrix and a structural matrix with three diagonal components using pre-defined mathematical techniques. The structural matrix is independent of the choice of coordinate systems and can be conventionally interpolated or filtered on each component.

The orientation information is contained in the rotational matrix. It is known from the theory of rotation operators that the rotational matrix can be a unit quaternion and have a unit 4-vector representation. It is preferred that the rotational matrix is a unit quaternion. Thus, the sequence of observed field gradient tensors can be associated with a path traced out on the surface of a unit 4-sphere. Interpolation of rotational matrices as quaternions can be carried out in this manifold, to yield a new unit 4-vector interpolant. This interpolant allows the corresponding rotational matrix to be reconstructed. In effect, this constitutes an interpolation process for rotational matrixes that yields only rotational matrices. Similar principles hold for the filtering operation, when extracting a frequency band from the raw signal.

The decomposition into structural and rotational parts yields 2+3 independent quantities respectively, conforming to the five degrees of freedom of the original formulation. The decomposed form, however, allows interpolation or filtering processes to emit only consistent matrix representations of the underlying tensors with regard to their structural and rotational field to gradient information content. Thus, an interpolated diagonal matrix and an interpolated rotational matrix together determine the reconstructed matrix of the field gradient tensor at the interrelation point in space.

The present invention allows for the separation of structural and rotational information, and provides a way of estimating more correctly, the tensor/gradient signal between observation data. It also provides an optimum way of resampling on to regular spaced intervals in preparation for fast fourier transform operations. This is the preferred technique for such re-sampling.

The present invention includes the facility to highlight inadequate data quality. This is achieved by recognising decompositions where the rotational quaternion is not near the real unit quaternion.

A problem arising in interpolation is deduction of meaning from data which does not support such meaning in the first place. The present invention provides a unique method of isolating areas in the data where interpolation cannot be supported.

As mentioned above, according to the invention, field gradient data is resolved into structural and rotational matrices in a step which is called decomposition. There can be a plurality of different structural/rotational representations of the same gradient tensor. In decomposition one of the tensor operands is taken as reference, relative to which the other operands are regarded as incremental. The reference may be chosen, for example, on the basis of being centrally located in the physical observation space.

The actual rotational decompositions must yield quaternions that are near the real unit quaternion of the reference. When such decomposition can be found, interpolation is sensible, and the process can be carried out to completion. If such a decomposition cannot be found, then a correct interpolation cannot be guaranteed and the process aborts, flagging an error. This case corresponds to a situation where either the data collection points are too sparse, or the signal has too much noise, of a combination of both effects, to make interpolation meaningless. For example, it would be meaningless to estimate the gradient tensor at a location when there are highly dispersed values at neighbouring sites.

The foregoing is a description of a compromise position adopted in the source code to handle real data in a pragmatic manner. The technique may be used during gridding, resampling and during visualisation.

During gridding, where the profile data is being interpolated to form a grid, one can assume that each profile's starting quaternion position (left-hand side or most Westerly for East-West lines) is correct, and then one can progressively track the quaternion from sample to sample along the individual profile. One then locally finds a minimum of three original observations from the profile that are nearest to the grid cell centroid that one needs to estimate. One relaxes the requirement that these three local tensors share a coherent quaternion and looks for a compromise best fit. This is done on a case-by-case basis without noting what the immediate neighbour has required. This yields a coherent tensor grid, but not a coherent quaternion distribution.

After obtaining the coherent tensor grid, one resamples that grid for the purposes of estimating the higher resolution of the full tensor field locally, as one pans and zooms, and examines one component or transformation of the tensor gradient field. For example, one may have for each pixel to be estimated, four surrounding tensors coming from the grid.

One penetrates into these tensors for the four original grid quaternions and does a best local fit. The tensor grid is quite acceptable, showing no obvious spikes or steps. However, when one now views the underlying interpolated quaternion component of interest, it is not coherent but reflects more of the noise/uncertainty in the signal.

According to a further aspect the present invention may also provide a method of interpolation between field gradient data sets, said method including the steps of:

acquiring said field gradient data sets, if said field gradient data sets are not in a predetermined format, converting said field gradient data sets into said predetermined format;

resolving said field gradient data sets into rotational and structural parts;

separately interpolating each of said rotational and structural parts; and recombining said interpolated rotational and structural parts.

Preferably said predetermined format is a vector or tensor format.

In a practical preferred embodiment said predetermined format is a tensor format expressed as a 3×3 matrix of values. Preferably said step of resolving said field gradient data sets results in rotational and structural matrices having three diagonal components or eigen values. It is also preferred that said rotational matrices are interpolated as quaternions on the surface of a unit 4-sphere which results in a new unit 4-vector interpolant.

According to yet a further aspect the present invention may also provide a method of imaging interpolated field gradient data, said method including the steps of:

acquiring field gradient data sets, if said field gradient data sets are not in a predetermined format, converting said field gradient data sets into said predetermined format;

resolving said field gradient data sets into rotational and structural parts;

separately interpolating each of said rotational and structural parts;

recombining said interpolated rotational and structural parts to yield said interpolated field gradient data; and producing a viewable display of the interpolated field gradient data on at least one display device.

Preferably said predetermined format is a vector or tensor format.

In a practical preferred embodiment said predetermined format is a tensor format expressed as a 3×3 matrix of values. Preferably said step of resolving said field gradient data sets results in rotational and structural matrices having three diagonal components or eigen values. It is also preferred that said rotational matrices are interpolated as quaternions on the surface of a unit 4-sphere which results in a new unit 4-vector interpolant.

According to yet a further aspect the present invention may also provide a computer-implemented method for processing field gradient data sets within memory of a computing device, said method including the steps of:

acquiring said field gradient data sets in said memory of said computing device, if said field gradient data sets are not in a predetermined format, converting said field gradient data sets into said predetermined format;

resolving said field gradient data sets into rotational and structural parts;

separately interpolating each of said rotational and structural parts; and recombining said interpolated rotational and structural parts.

Preferably said predetermined format is a vector or tensor format.

In a practical preferred embodiment said predetermined format is a tensor format expressed as a 3×3 matrix of values. Preferably said step of resolving said field gradient data sets results in rotational and structural matrices having three diagonal components or eigen values. It is also preferred that said rotational matrices are interpolated as quaternions on the surface of a unit 4-sphere which results in a new unit 4-vector interpolant.

In a further practical preferred embodiment said computer-implemented method further includes the step of producing a viewable display of the interpolated field gradient data sets on at least one display device associated with said computing device.

According to yet a further aspect the present invention may also provide a computer-implemented method for interpolating between field gradient data sets within a memory of a computing device, said method including the steps of:

acquiring said field gradient data sets in said memory of said computing device, if said field gradient data sets are not in a predetermined format, converting said field gradient data sets into said predetermined format;

resolving said field gradient data sets into rotational and structural parts;

separately interpolating each of said rotational and structural parts; and recombining said interpolated rotational and structural parts.

Preferably said predetermined format is a vector or tensor format.

In a practical preferred embodiment said predetermined format is a tensor format expressed as a 3×3 matrix of values. Preferably said step of resolving said field gradient data sets results in rotational and structural matrices having three diagonal components or eigen values. It is also preferred that said rotational matrices are interpolated as quaternions on the surface of a unit 4-sphere which results in a new unit 4-vector interpolant.

In a further practical preferred embodiment said computer-implemented method further includes the step of producing a viewable display of the interpolated field gradient data sets on at least one display device associated with said computing device.

According to yet a further aspect the present invention may also provide a machine readable medium storing a set of instructions that, when executed by a machine, cause the machine to execute a method of interpolating between field gradient data sets, the method including:

acquiring said field gradient data sets, if said field gradient data sets are not in a predetermined format, converting said field gradient data sets into said predetermined format;

resolving said field gradient data sets into rotational and structural parts;

separately interpolating each of said rotational and structural parts; and recombining said interpolated rotational and structural parts.

Preferably said predetermined format is a vector or tensor format.

In a practical preferred embodiment said predetermined format is a tensor format expressed as a 3×3 matrix of values. Preferably said step of resolving said field gradient data sets results in rotational and structural matrices having three diagonal components or eigen values. It is also preferred that said rotational matrices are interpolated as quaternions on the surface of a unit 4-sphere which results in a new unit 4-vector interpolant.

According to yet a further aspect the present invention may also provide a computer program including computer program code adapted to perform some or all of the steps of the method as described with reference to any one of the preceding paragraphs, when said computer program is run on a computer.

According to yet a further aspect the present invention may also provide a computer program according to the preceding paragraph embodied on a computer readable medium.

According to yet a further aspect the present invention may also provide a set of computer readable instructions embodied on a computer-readable medium, which when executed by a computer processor cause the computer processor to execute a process including:

acquiring field gradient data sets, if said field gradient data sets are not in a predetermined format, converting said field gradient data sets into said predetermined format;

resolving said field gradient data sets into rotational and structural parts;

separately interpolating each of said rotational and structural parts; and recombining said interpolated rotational and structural parts.

Preferably said predetermined format is a vector or tensor format.

In a practical preferred embodiment said predetermined format is a tensor format expressed as a 3×3 matrix of values. Preferably said step of resolving said field gradient data sets results in rotational and structural matrices having three diagonal components or eigen values. It is also preferred that said rotational matrices are interpolated as quaternions on the surface of a unit 4-sphere which results in a new unit 4-vector interpolant.

According to yet a further aspect the present invention may also provide a computer program executable by a computer, the program including the functions of:

acquiring field gradient data sets, if said field gradient data sets are not in a predetermined format, converting said field gradient data sets into said predetermined format;

resolving said field gradient data sets into rotational and structural parts;

separately interpolating each of said rotational and structural parts; and recombining said interpolated rotational and structural parts.

Preferably said predetermined format is a vector or tensor format.

In a practical preferred embodiment said predetermined format is a tensor format expressed as a 3×3 matrix of values. Preferably said step of resolving said field gradient data sets results in rotational and structural matrices having three diagonal components or eigen values. It is also preferred that said rotational matrices are interpolated as quaternions on the surface of a unit 4-sphere which results in a new unit 4-vector interpolant.

DESCRIPTION OF THE PREFERRED EMBODIMENT

In order that the invention may be more clearly understood, a preferred non-limiting embodiment is described by reference to the accompanying FIG. 1.

FIG. 1 is a flow diagram outlining the steps in performing a preferred embodiment of the invention.

In step 1 the field gradient data, provided, for example, by an aerial geophysical field gradient survey, is accessed and in Step 2 is converted into a preferred predetermined format being 3-dimensional tensors of rank 2. The field gradient tensors are expressed as 3×3 matrices. Each of these matrices is resolved by predefined mathematical techniques into a rotational matrix and a structural matrix in Step 3. Each rotational matrix and each structural matrix has three diagonal components or eigen values.

The structural matrices are interpolated using standard mathematical techniques. As the structural matrices are independent of the choice of coordinate systems, they can be interpolated or filtered conventionally on each component (Step 4).

The rotational matrices contain the orientation information. As the rotational matrices are unit quaternions and have unit 4-vector representations, the sequence of observed field gradient tensors can be associated with a path traced out on the surface of a unit 4-sphere. Interpolation is carried out in this manifold, to yield new unit 4-vector interpolants (Step 5). These interpolants allow the corresponding rotational matrices to be reconstructed. In effect, this constitutes an interpolation process for rotational matrixes that yields only rotational matrices. Similar principles hold for the filtering operation when extracting a frequency band from the raw signal.

The decomposition into structural and rotational parts yields 2+3 independent quantities respectively, conforming to the five degrees of freedom of the original formulation. The decomposed form, however, allows interpolation or filtering processes to emit only consistent matrix representations of the underlying tensors with regard to their structural and rotational field to gradient information content. Thus, an interpolated diagonal matrix and an interpolated rotational matrix together determine the reconstructed matrix of the field gradient tensor at the interrelation point in space (Step 6).

The interpolated field gradient tensors may be displayed as a viewable display on a display device such as a computer monitor.

It should be understood that the above disclosure describes only one preferred embodiment of the invention, and that various modifications, alterations, and/or additions may be made thereto without departing from the spirit and scope of the invention.

Any reference to any prior art in the foregoing description is not, and should not be taken as, an acknowledgement of or any form of suggestion that that prior art forms part of the common general knowledge in any country.

What is claimed:

1. A computer-implemented method of processing field gradient data sets, said method comprising the steps of:
   acquiring said field gradient data sets in a memory of a computer;
   converting, via the computer, said field gradient data sets into a predetermined format if said field gradient data sets are not already in that predetermined format;
   resolving, via the computer, said field gradient data sets into rotational and structural parts;
   interpolating, via the computer, each of said rotational and structural parts;
   recombining, via the computer, said interpolated rotational and structural parts to form reconstructed field gradient data sets; and
   producing a viewable display of the reconstructed field gradient data sets on at least one computer display device associated with said computer;
   wherein said predetermined format is a tensor format expressed as three-dimensional tensors of rank 2.

2. The method of claim 1, wherein said tensor format is expressed as a 3×3 matrix of values.

3. The method of claim 1, wherein the step of resolving said field gradient data sets results in rotational and structural matrices having three diagonal components or eigenvalues.

4. The method of claim 3, wherein said rotational matrices are interpolated as quaternions on the surface of a unit 4-sphere which results in a new unit 4-vector interpolant.

5. A computer-implemented method of processing geophysical field gradient data sets, said method including the steps of:
   acquiring said geophysical field gradient data sets in a memory of a computer;
   converting, via the computer, said geophysical field gradient data sets into a predetermined format if said geophysical field gradient data sets are not already in that predetermined format;
   resolving, via the computer, said geophysical field gradient data sets into rotational and structural parts;
   interpolating, via the computer, each of said rotational and structural parts;
   recombining, via the computer, said interpolated rotational and structural parts to form reconstructed geophysical field gradient data sets; and
   producing a viewable display of the processed geophysical field gradient data sets on at least one computer display device associated with said computer.

6. The method of claim 5, wherein said predetermined format is a tensor format.

7. The method of claim 6, wherein said tensor format is expressed as three-dimensional tensors of rank 2.

8. The method of claim 6, wherein said tensor format is expressed as a 3×3 matrix of values.

9. The method of claim 5, wherein said step of resolving said field gradient data sets results in rotational and structural matrices having three diagonal components or eigenvalues.

10. The method of claim 9, wherein said rotational matrices are interpolated as quaternions on the surface of a unit 4-sphere which results in a new unit 4-vector interpolant.

* * * * *